US009137151B2

(12) United States Patent
Grossman

(10) Patent No.: US 9,137,151 B2
(45) Date of Patent: Sep. 15, 2015

(54) REDUNDANT ARCHITECTURE FOR FAILOVER OF TRANSCODER INSTANCES

(71) Applicant: Google Technology Holdings LLC, Mountain View, CA (US)

(72) Inventor: Michael A. Grossman, San Diego, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 206 days.

(21) Appl. No.: 13/863,295

(22) Filed: Apr. 15, 2013

(65) Prior Publication Data

US 2013/0308440 A1 Nov. 21, 2013

Related U.S. Application Data

(60) Provisional application No. 61/649,095, filed on May 18, 2012, provisional application No. 61/649,108, filed on May 18, 2012.

(51) Int. Cl.
*H04L 1/22* (2006.01)
*H04L 12/703* (2013.01)
*H04L 29/06* (2006.01)

(52) U.S. Cl.
CPC .............. *H04L 45/28* (2013.01); *H04L 65/605* (2013.01); *H04L 65/80* (2013.01)

(58) Field of Classification Search
None
See application file for complete search history.

(56) References Cited

U.S. PATENT DOCUMENTS

| 7,620,038 | B1 | 11/2009 | Niebel |
| 7,705,880 | B2 * | 4/2010 | Dvir et al. ...................... 348/143 |
| 2006/0018254 | A1 * | 1/2006 | Sanders et al. ................ 370/216 |
| 2007/0076591 | A1 | 4/2007 | Khan et al. |
| 2009/0069021 | A1 * | 3/2009 | Barroso ......................... 455/450 |
| 2009/0228933 | A1 | 9/2009 | Asbun et al. |
| 2012/0128061 | A1 * | 5/2012 | Labrozzi et al. ......... 375/240.02 |
| 2013/0156094 | A1 * | 6/2013 | Syed et al. ............... 375/240.02 |
| 2014/0040500 | A1 * | 2/2014 | Zheng et al. .................. 709/231 |
| 2015/0003517 | A1 * | 1/2015 | Misumi ..................... 375/240.02 |

OTHER PUBLICATIONS

Patent Cooperation Treaty, International Search Report and Written Opinion of the International Searching Authority for International Application No. PCT/US2024/052487 (CS40234), Aug. 5, 2013, 10 pages.

* cited by examiner

*Primary Examiner* — Hassan Phillips
*Assistant Examiner* — Duc Duong
(74) *Attorney, Agent, or Firm* — Fish & Richardson P.C.

(57) ABSTRACT

In one embodiment, a system includes a first subsystem that includes components configured to route video to transcoder instances for transcoding. The first subsystem includes a first host CPU configured to coordinate routing of first IP packets including video through a first routing system to the transcoder instances. The system also includes a second subsystem that includes components configured to route video to transcoder instances for transcoding. The second subsystem includes a second host CPU configured to coordinate routing of second IP packets including video through a second routing system to the transcoder instances. A redundancy connection connects the first subsystem and the second subsystem together to allow routing of the first IP packets or the second IP packets from the one of first subsystem and the second subsystem through the other of the first subsystem and the second subsystem.

20 Claims, 7 Drawing Sheets (1)

REDUNDANT ARCHITECTURE FOR FAILOVER OF TRANSCODER INSTANCES

CROSS-REFERENCES TO RELATED APPLICATIONS

The present disclosure claims priority to:
U.S. Provisional App. No. 61/649,095, entitled "REDUNDANT TRANSCODER ARCHITECTURE INCORPORATING MULTIPLE INDEPENDENT CROSS-COUPLED SUBSYSTEMS WITH POWER SUPPLY REDUNDANCY PROVIDING A RELIABLE SELF HEALING FAIL-OVER MECHANISM", filed May 18, 2012, and
U.S. Provisional App. No. 61/649,108, entitled "MODULAR AND SCALABLE TRANSCODER ARCHITECTURE PARTITIONED VIA IP CONNECTED CIRCUIT BOARDS ENABLING A RANGE OF TRANSCODER SOLUTIONS TO BE PACKAGED BY INSTALLING DIFFERENT CIRCUIT BOARD TYPES ONTO AN ETHERNET SWITCH ROUTER BACKPLANE", filed May 18, 2012, the contents of all of which are incorporated herein by reference in their entirety.

BACKGROUND

Transcoder products have typically been limited to one or two channels. However, system-on-a-chip (SOC) technologies allow a transcoder product to integrate a larger number of transcoder channels into a single chassis via multiple transcoder SOC instances. The transcoder SOC instances may perform transcoding in parallel. A host computer processor unit (CPU) communicates with each of the transcoder SOC instances to coordinate the transcoding.

When performing certain mission-critical operations, an infrastructure that guarantees high availability is required. Traditional transcoder products offer hot swapability for components that may fail, such as a transcoder instance. This type of redundancy usually comes at a very high cost. However, hot swapability allows the infrastructure to operate at close to 100% capacity at all times. That is, when a component fails, a new component can be swapped into the infrastructure to replace the failed component while the system continues to run. Thus, the amount of time in which the system is running at less than 100% is low.

DETAILED DESCRIPTION

Figure 1:
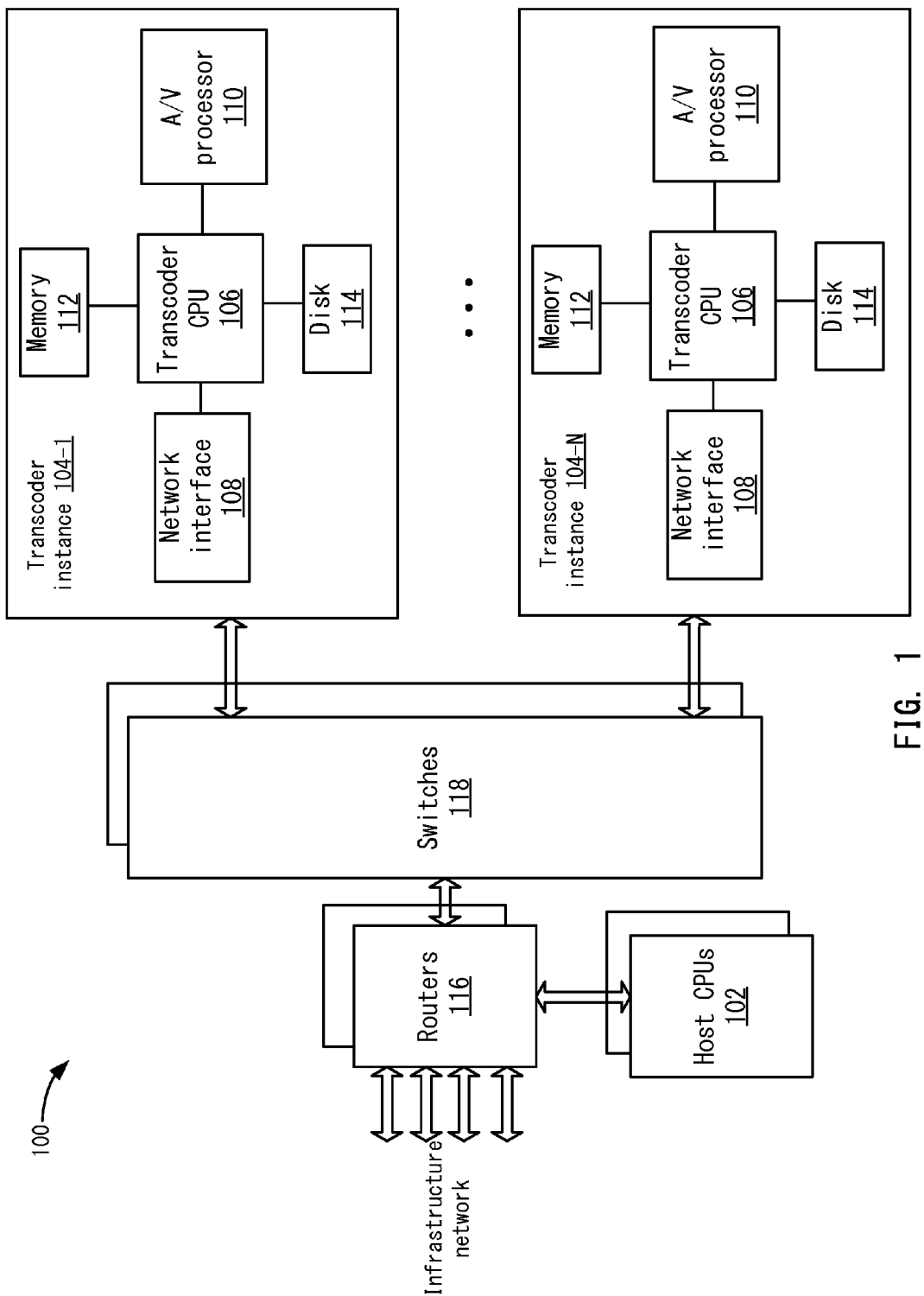
FIG. 1 depicts a system for transcoding video according to one embodiment.

Described herein are techniques for a transcoder including failover protection. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

In one embodiment, a system includes a first subsystem that includes a first plurality of components configured to route video to a first plurality of transcoder instances for transcoding. The first subsystem includes a first host CPU configured to coordinate routing of first IP packets including video through a first routing system to the first plurality of transcoder instances. The system also includes a second subsystem that includes a second plurality of components configured to route the video to a second plurality of transcoder instances for transcoding. The second subsystem includes a second host CPU configured to coordinate routing of second IP packets including the video through a second routing system to the second plurality of transcoder instances. A redundancy connection connects the first subsystem and the second subsystem together to allow routing of the first IP packets or the second IP packets from the one of first subsystem and the second subsystem through the other of the first subsystem and the second subsystem.

In one embodiment, a method for transcoding video includes: detecting a network topology, wherein the network topology includes: a first subsystem comprising a first plurality of components configured to route the video to a first plurality of transcoder instances for transcoding, wherein the first subsystem includes a first host CPU configured to coordinate routing of first IP packets including the video through a first routing system to the first plurality of transcoder instances; a second subsystem comprising a second plurality of components configured to route the video to a second plurality of transcoder instances for transcoding, wherein the second subsystem includes a second host CPU configured to coordinate routing of second IP packets including the video through a second routing system to the second plurality of transcoder instances; determining a failure of a component within one of the first subsystem or the second subsystem; detecting an alternative path through a redundancy connection that connects the first subsystem and the second subsystem together; and dynamically changing routing of the first IP packets or the second IP packets from the one of first subsystem and the second subsystem through the other of the first subsystem and the second subsystem via the redundancy connection.

In one embodiment, an apparatus configured to process video in a system including a host computer processing unit (CPU) and a plurality of transcoder instances includes: one or more computer processors; and a non-transitory computer-readable storage medium containing instructions that, when executed, control the one or more computer processors to be configured for: detecting a network topology, wherein the network topology includes: a first subsystem comprising a first plurality of components configured to route the video to a first plurality of transcoder instances for transcoding, wherein the first subsystem includes a first host CPU configured to coordinate routing of first IP packets including the video through a first routing system to the first plurality of transcoder instances; a second subsystem comprising a second plurality of components configured to route the video to a second plurality of transcoder instances for transcoding, wherein the second subsystem includes a second host CPU configured to coordinate routing of second IP packets including the video through a second routing system to the second plurality of transcoder instances; determining a failure of a component within one of the first subsystem or the second subsystem; detecting an alternative path through a redundancy connection that connects the first subsystem and the second subsystem together; and dynamically changing routing of the first IP packets or the second IP packets from the one of first subsystem and the second subsystem through the other of the first subsystem and the second subsystem via the redundancy connection.

FIG. 1 depicts a system 100 for transcoding video according to one embodiment. In one embodiment, system 100 may be integrated into a single transcoding device, such as a single chassis device (e.g., a 1RU rack unit). Additionally, system 100 may include multiple rack units that communicate together via a backplane to transcode video.

Host central processing units (CPU) 102 communicate with multiple transcoder instances 104-1-104-N. Host CPUs 102 may be a central processing unit that coordinates transcoding operations to be performed on transcoder instances 104-1-104-N.

Transcoder instances 104 may be system-on-a-chip (SOC) entities. Transcoder instances 104 include a transcoder CPU 106 in addition to other entities, such as a network interface 108, an audio/video (A/V) processor 110, memory 112, and disk storage 114. Particular embodiments allow host CPU 102 to offload functions normally performed by host CPU 102 to transcoder instances 104 because each transcoder instance 104 includes a transcoder CPU 106 that is capable of performing some functions normally performed by host CPU 102. Transcoder CPUs 106 then perform the functions in parallel within transcoder instances 104. Each transcoder CPU 104 is responsible for performing tasks within a respective transcoder instance 104 and not for other transcoder instances.

In one embodiment, host CPU 102 uses a routing system, such as routers 116 and switches 118, to communicate with transcoder instances 104. In one embodiment, the use of routers 116 and switches 118 (or other comparable routing systems) allows host CPU 102 to communicate using Internet protocol (IP) packets. For example, each transcoder instance 104 includes a network interface 108 that can receive IP packets. This allows communication between host CPUs 102 and transcoder instances 104 via a universal networking standard, such as Ethernet. In this case, host CPUs 102 do not need to send control signals via a PCI bus or communicate video via an MPEG transport stream. Rather, the control signals and video data are encapsulated in IP packets and routed via routers 116 and switches 118.

By sending video data in IP packets, FPGA logic is not needed to process or send video data in a video transport stream outside of transcoder instances 104. The video transport stream may be in a standard for transcoding video, such as an MPEG. Host CPUs 102 offload the processing of the video transport stream to transcoder instances 104. For example, video data is encapsulated in the IP packets. Transcoder CPU 106 receives the IP packets through network interface 108. Because A/V processor 110 needs to perform transcoding operations on a video transport stream, transcoder instance 104 needs to convert the video in the payload of the IP packets to the video transport stream. Network interface 108 can de-capsulate the received IP packets to retrieve the video data from the payload of the IP packets. Transcoder CPU 106 may then coordinate generation of a video transport stream. Once in this format, transcoder instance 104 can perform various transcoding services on the video transport stream. For example, A/V processor 110 may transcode (e.g., encode or decode) the video transport stream.

Host CPUs 102 may also send control commands in IP packets. Transcoder CPU 106 may then de-capsulate the IP packets to determine the control signals, which are then processed by transcoder CPU 106. Not only are the video data and control signals sent via the same channel and network interface, expensive PCI silicon and FPGA logic is not needed outside of the transcoder instances 104.

Figure 2A:
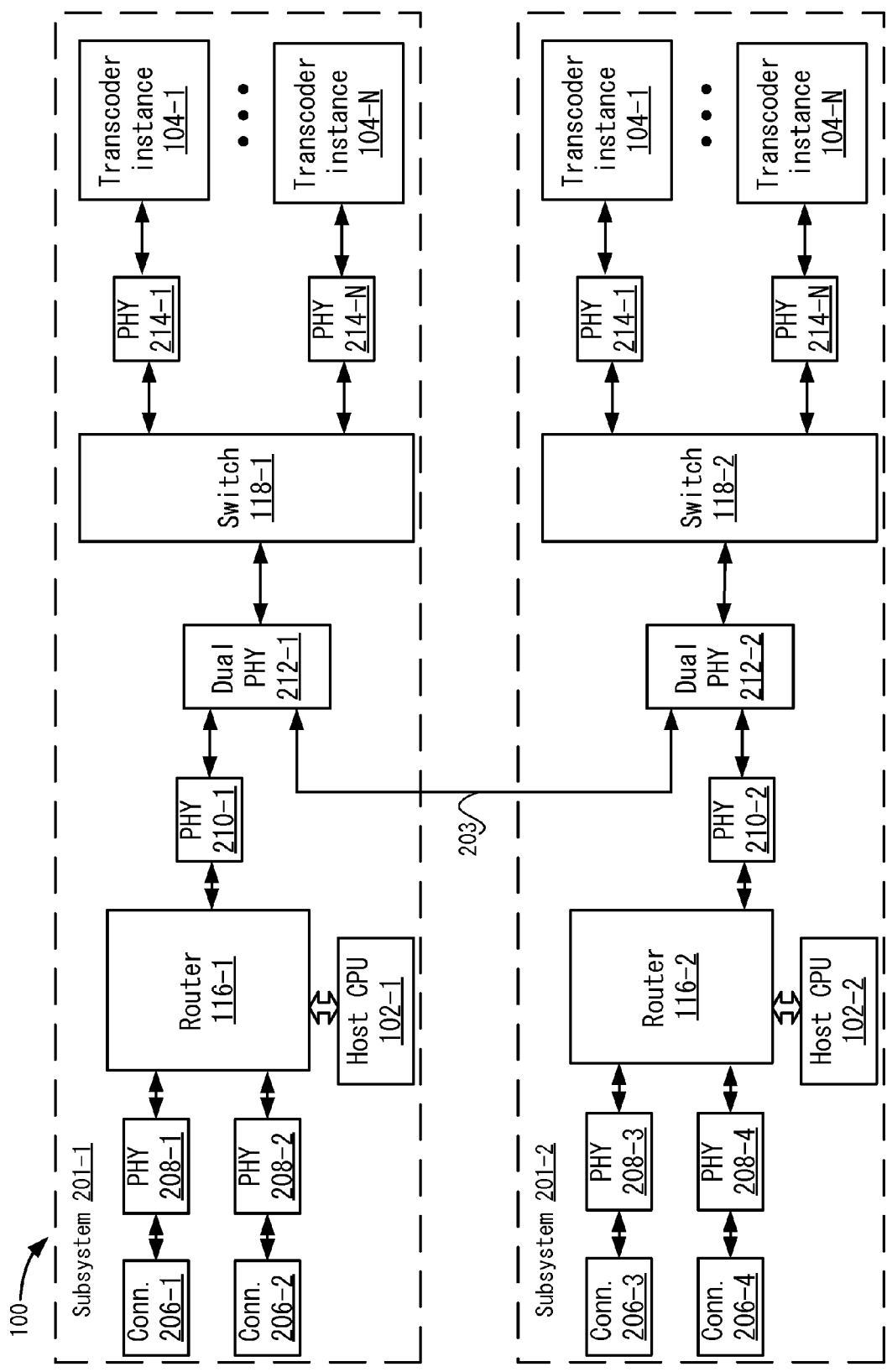
FIG. 2A depicts a more detailed example of the system according to one embodiment.

FIG. 2A depicts a more detailed example of a system 100 according to one embodiment. System 100 includes multiple subsystems 201 that are cross-coupled together. For example, a subsystem 201-1 and a subsystem 201-2 are cross-coupled together via a redundancy connection 203. Redundancy connection 203 may cross-couple components of subsystem 201-1 and subsystem 201-2 to create multiple paths that are used to provide failover protection, which will be described in more detail below. Also, although only two subsystems are coupled together, multiple subsystems may be coupled together.

Particular embodiments provide a self-healing failover mechanism that eliminates the high cost of hot swapability. System 100 includes many redundancy features that are incorporated at multiple points of potential failure that provide failover capability. In one embodiment, system 100 provides failover capability at the expense of reduced processing capability. For example, if a component of one of subsystem 201 fails, failover may occur such that system 100 can continue operating; however, throughput may be reduced by a certain percentage. This concept will be described in more detail below.

Subsystems 201 include duplications of components and may perform similar operations in parallel. Each subsystem 201 may process multiple streams at data. For example, each subsystem 201 may include multiple channels. In one embodiment, each subsystem 201 includes two connectors (Conn.) 206. The connector may be a standard connector, such as an RJ45 connector, but other connectors may be appreciated. For example, subsystem 201-1 includes a connector 206-1 and a connector 206-2. Subsystem 201-2 includes a connector 206-3 and a connector 206-4. Each connector 206 forms the beginning of a channel. Also, different numbers of channels may be provided.

A physical interface (PHY) 208 provides an interface between connector 206 and a router 116. For example, interface 208 may be a gigabit Ethernet physical interface (GIG E-PHY). Subsystem 201 may have a physical interface 208-1 coupled to connector 206-1 and a physical interface 208-2 coupled to connector 206-2. Router 116-1 is also coupled to physical interfaces 208-1 and 208-2. Also, subsystem 201-2 may include a physical interface 208-3 coupled to connector 206-3 and a physical interface 208-4 coupled to connector 206-4. Router 116-2 is also coupled to physical interfaces 208-3 and 208-4. If a different number of channels are provided, different numbers of physical interfaces 208 are needed.

Host processor 102-1 controls subsystem 201-1 and host processor 102-2 controls subsystem 201-2. Host processors 102-1 and 102-2 coordinate the routing of IP packets to transcoder instances 104. Additionally, host processors 102-1 and 102-2 coordinate the sending of control information via IP packets. Each subsystem 201 may communicate using an IP routing subsystem as described above.

After router 116, another physical interface 210 is provided. In this case, a single physical interface 210-1 is coupled to router 116 and a single physical interface 210-2 is coupled to router 116-2. The single interface 210 is used because traffic from multiple channels is converted into a single stream; however, multiple interfaces may be used.

A dual physical interface 212-1 is coupled to a second physical interface 210-1 and another dual physical interface 212-2 is coupled to second physical interface 210-2. Dual physical interfaces 212 are dual in that two connections are provided. One connection to dual physical interface 212-1 is to second physical interface 210-1 and another connection is to redundancy connection 203, which connects subsystems 201-1 and 201-2 together. Although this point of connection between sub-systems 201-1 and 201-2 is described, other points of connection may be appreciated. Also, dual physical interface 212-2 is coupled to second physical interface 210-2 and also to redundancy connection 203. By connecting dual physical interfaces 212-1 and 212-2 together, redundancy is provided in system 100. The different redundancy paths that are provided will be described in more detail below.

A switch 118 is coupled to dual physical interface 212. For example, switch 118-1 is coupled to dual physical interface 212-1 and a switch 118-2 is coupled to dual physical interface 212-2. Switches 118 may be N-port gigabit Ethernet-managed switches that can switch IP packets among various transcoder instances 104-1-104-N in each respective subsystem 201. A third physical interface 214 is between each transcoder instance 104 and switch 118.

Figure 2B:
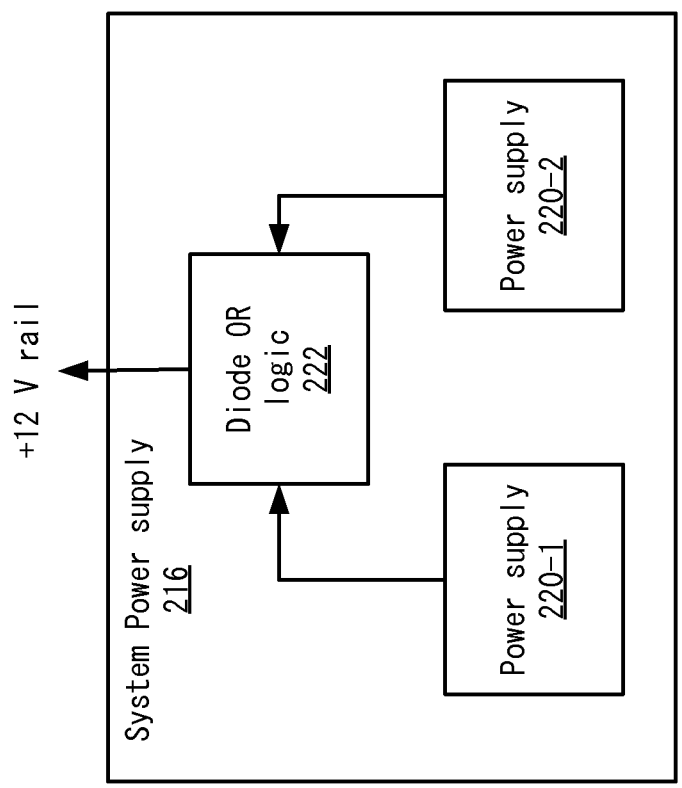
FIG. 2B depicts a system power supply according to one embodiment.

Additionally, FIG. 2B depicts a system power supply 216 according to one embodiment. System power supply 216 provides additional redundancy. For example, a power supply 220-1 and a power supply 220-2 are provided. A diode OR logic 222 provides power supply redundancy in the event of a power supply failure. For example, if one power supply 220 fails, then the other power supply 220 may be used as the system power source. As will be described in more detail below, multiple components in each subsystem 201 may also include isolation circuits that prevent the shorting of a component to the rail, which would cause a failure in system 100. This isolates components of system 100.

Figure 3:
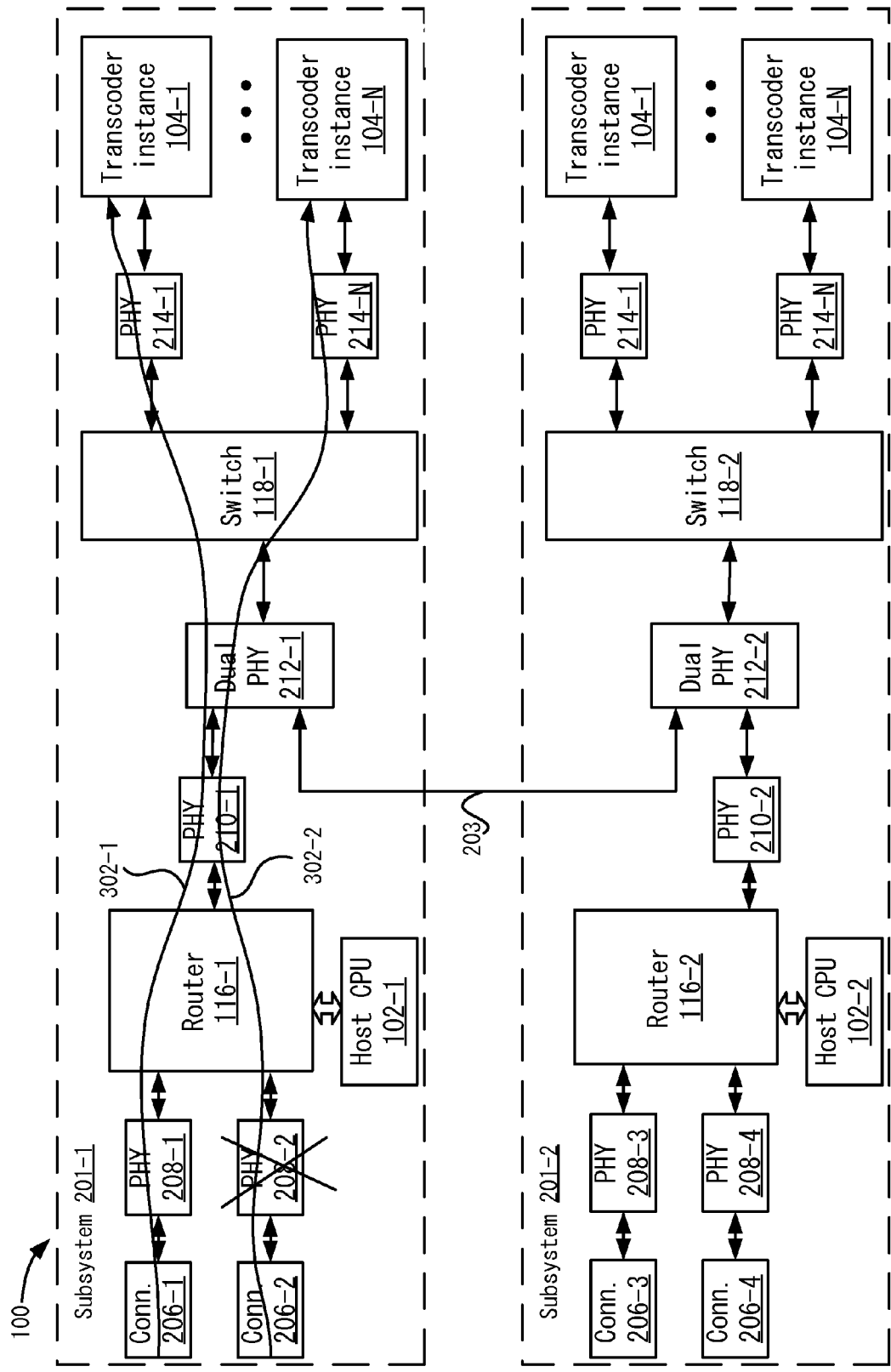
FIG. 3 shows an example of redundancy provided within a subsystem according to one embodiment.

Particular embodiments provide various points of redundancy. FIG. 3 shows an example of redundancy provided within a subsystem 201 according to one embodiment. As shown, a path 302-1 and a path 302-2 are provided into router 116. Thus, if a port fails on router 116, such as the port coupled to interface 208-2 and connector 206-2 fails, path 302-1 may still be used. In this case, the throughput through subsystem 201-1 may be reduced by 50% as all information needs to flow through path 302-1. However, data can still flow through subsystem 201.

Figure 4:
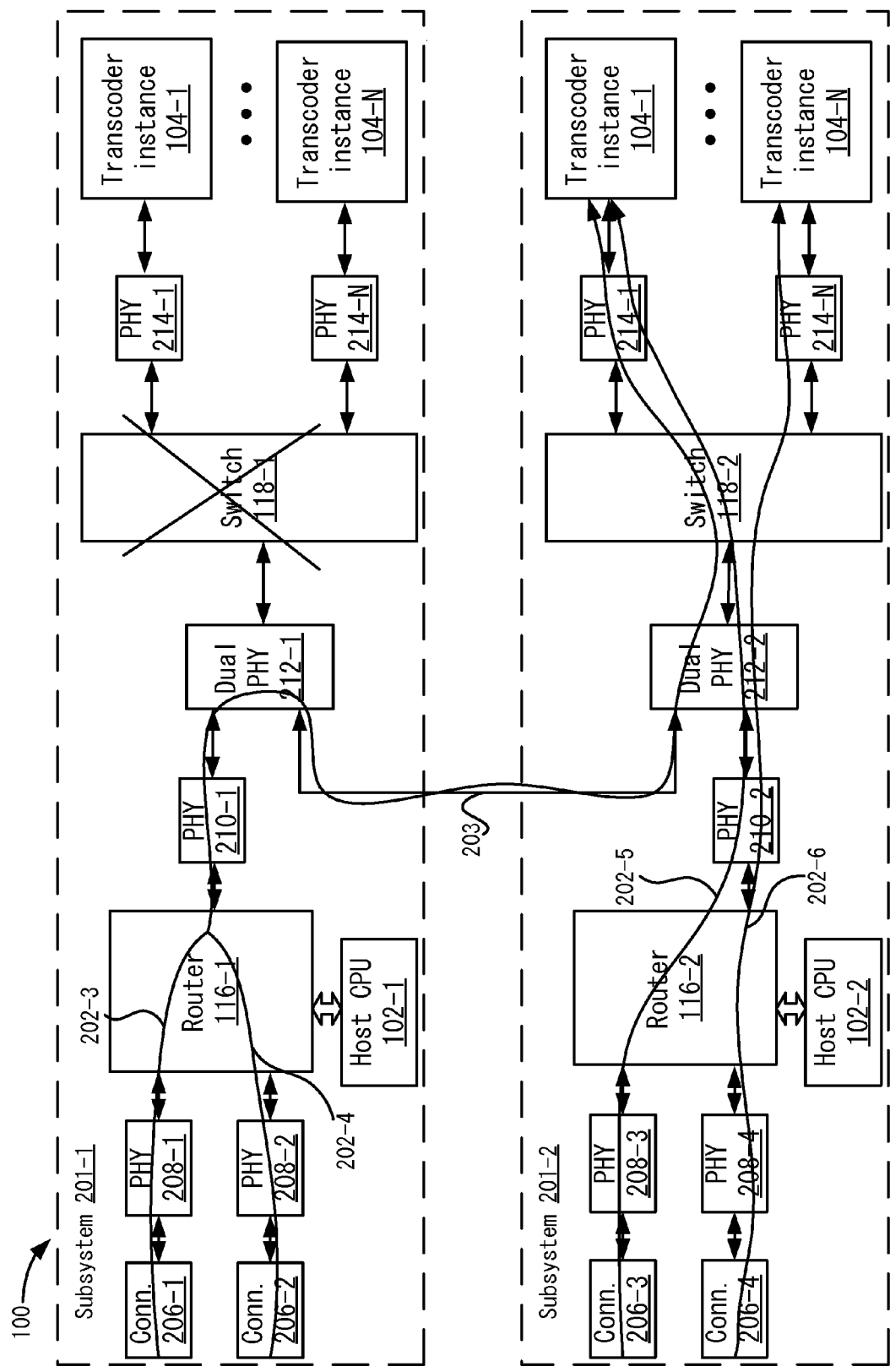
FIG. 4 depicts another example of redundancy when a switch fails according to one embodiment.

FIG. 4 depicts another example of redundancy when a switch 118 fails according to one embodiment. In this case, communication with transcoder instances 104 within subsystem 201-1 cannot be performed. However, using redundancy connection 203, information flowing through paths 202-3 and 202-4 may be routed through redundancy connection 203 through switch 118-2. The transcoding capacity of system 100 is reduced in half because transcoder instances in subsystem 201-1 cannot be used; however, the system retains full network throughput. That is, data can still be received through paths 202-3 and 202-4 in addition to paths 202-5 and 202-6 within subsystem 201-2.

If host CPU 102 fails, system 100 may failover to use the other host CPU 102. However, the only active host CPU may operate at 50% of the performance, but at full channel capacity and network throughput. That is, host CPU 102 does not have the same computing resources as two host CPUs so cannot operate at the same performance level when performing the tasks of the other host CPU. The active host CPU 102 can communicate with components of the other subsystem 201 through redundancy connection 203.

Additionally, system power supply 126 uses the diode OR logic 222 to provide full-system power supply redundancy in the event of one of the power supply failures. Thus, full power can be provided when one system power supply fails.

Host CPU 102 uses a protocol that can discover the available network paths. For example, spanning tree protocol (STP) can dynamically discover the network topology and assure that a correct path is used through the network. When one path is blocked due to a failure, host CPU 102 uses STP to detect the condition and enables an alternative connection. Host CPU 102 then configures system 102 to use the alternative connection dynamically.

Figure 5:
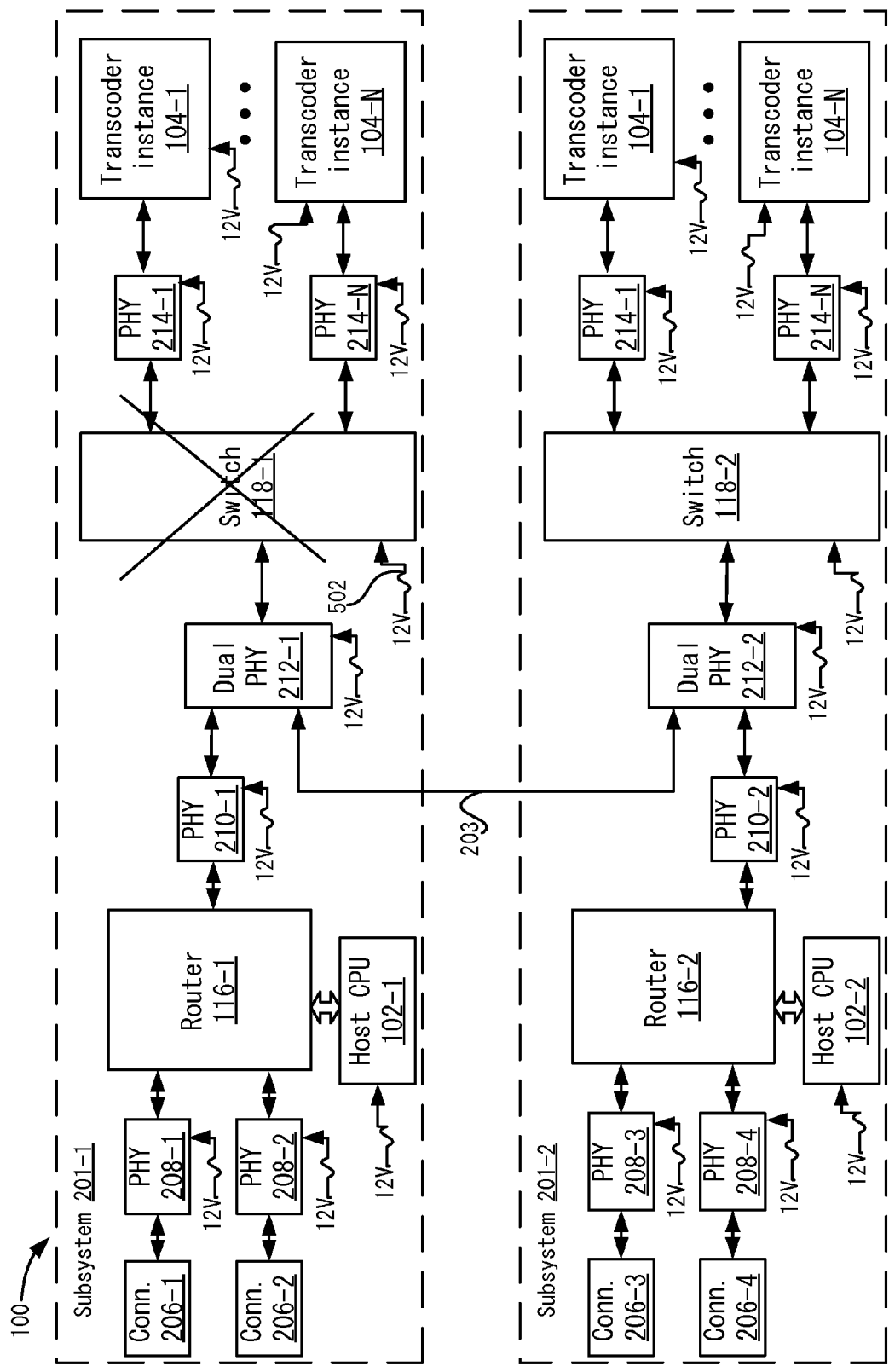
FIG. 5 depicts an example of power supply isolation for the system according to one embodiment.

Each subsystem 201 has power supply isolation to avoid bringing down the entire system due to a failure. For example, if a component fails, a short may occur to the power supply rail, which would cause the system to fail. FIG. 5 depicts an example of power supply isolation for system 100 according to one embodiment. As shown, various components include an isolation circuit 502 that can be tripped when a failure occurs. Isolation circuit 502 may be a fuse or circuit breaker. Isolation circuit 502, when it is tripped, breaks the circuit from the system power rail to the component. Thus, a short does not occur to the rail.

The system power provides a +12 (other voltages may be used) volt rail. Components in subsystems 201 are connected to the rail. In one example, if a switch 118 fails, then isolation circuit 502 is tripped and isolates switch 118 from the power supply rail such that a short does not occur. Similarly, other components include isolation circuits that are coupled between the power supply rail and the component. Thus, each subsystem 201 is fully self-contained with each component having its own independent isolation circuit. Should any subsystem component fail, isolation circuit 502 trips taking the component offline, but not compromising the power distribution to the remainder of subsystem 201.

The failure can be detected in multiple ways, such as via host processor 102 polling components (e.g., using keep-alive signals), power supply signaling, and/or loss of a link status. Following the analysis described above, the loss of power to any single component will also cause the requirement that traffic be routed through a different route. That is, redundancy may be used such that the capacity of system 100 may be reduced. For example, if the power to switch 118 fails, then the traffic may need to be re-routed through redundancy connection 203 as described in FIG. 4. This reduces channel capacity by 50%, but system 100 still can process the video. Also, if the power to router 116-1 fails, traffic may be routed through the other router 116-2, where system 100 retains full channel capacity but network throughput is reduced by 50%.

Figure 6:
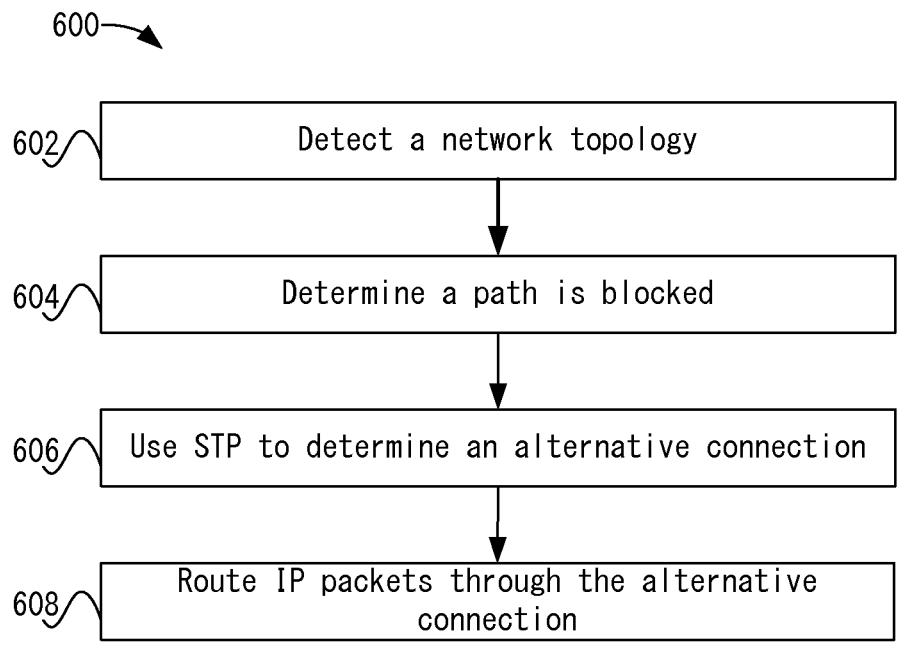
FIG. 6 depicts a simplified flowchart of a method for performing a failover operation according to one embodiment.

FIG. 6 depicts a simplified flowchart of a method for performing a failover operation according to one embodiment. At 602, host CPU 102 detects a network topology. For example, host CPU 102 uses STP to dynamically discover the network topology. At 604, host CPU 102 determines a path is blocked. If not, system 100 continues to operate in a normal manner. At 606, when host CPU 102 detects a failure, host CPU 102 uses STP to determine an alternative connection. At 608, host 102 then routes IP packets through the alternative connection.

Modularity

Particular embodiments use a modular design. System 100 may be configured in a modular architecture. For example, a modular architecture allows for a wide range of transcoder solutions to be packaged within the same chassis and backplane design without the need to re-design other parts of the system. By providing an IP-based interface, such as IP receiver interface 308 and IP transmitter interface 312, the interfaces are standardized for transcoder instances 104. That is, each transcoder instance 104 would use the same protocol to send and receive IP packets. However, if the conventional MPEG transport stream for video and PCI being used for control is used, different transcoder instances 104 may use proprietary non-IP based interfaces that would not allow common interfacing techniques to be used. That is, when a transcoder instance 104 needs to be inserted into system 100, the proprietary non-IP based interface would not allow for a modular architecture to be realized. Rather, programming to insert the new transcoder instance 104 would be needed to interface with the proprietary interface. However, because system 100 includes a common IP-based backplane design in which each transcoder instance 104 communicates via an IP protocol, such as Ethernet, to router 116 and switch 118 for both control and also communication of video, transcoder instances 104 may be removed and inserted in a modular fashion. That is, reconfiguration of the system is not needed to insert various transcoder instances 104.

Also, the use of an IP-based backplane design for communication enables system 100 to be highly scalable by cascading multiple Ethernet switches 118 and routers 116. That is, additional routers and switches may be added as additional transcoder instances 104 are added.

Due to each transcoder instance 104 being modular, redundancy may be provided in that the traffic from one subsystem 201 may be re-routed to subsystem 201-2. Transcoder instances 104 in subsystem 201-2 can perform the same operations as transcoder instances 104-1 in subsystem 201-1.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be operable to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A system comprising:
a first subsystem comprising a first plurality of components configured to route video to a first plurality of transcoder instances for transcoding, wherein the first subsystem includes a first host CPU configured to coordinate routing of first IP packets including the video through a first routing system to the first plurality of transcoder instances;
a second subsystem comprising a second plurality of components configured to route the video to a second plurality of transcoder instances for transcoding, wherein the second subsystem includes a second host CPU configured to coordinate routing of second IP packets including the video through a second routing system to the second plurality of transcoder instances; and
a redundancy connection that connects the first subsystem and the second subsystem together to allow routing of the first IP packets or the second IP packets from the one of first subsystem and the second subsystem through the other of the first subsystem and the second subsystem,
wherein the first subsystem includes a first dual physical interface and the second subsystem includes a second dual physical interface, and the first dual physical interface and the second dual physical interface are coupled together to form the redundancy connection.

2. A system comprising:
a first subsystem comprising a first plurality of components configured to route video to a first plurality of transcoder instances for transcoding, wherein the first subsystem includes a first host CPU configured to coordinate routing of first IP packets including the video through a first routing system to the first plurality of transcoder instances;
a second subsystem comprising a second plurality of components configured to route the video to a second plurality of transcoder instances for transcoding, wherein the second subsystem includes a second host CPU configured to coordinate routine of second IP packets including the video through a second routin system to the second plurality of transcoder instances; and
a redundancy connection that connects the first subsystem and the second subsystem together to allow routing of the first IP packets or the second IP packets from the one of first subsystem and the second subsystem through the other of the first subsystem and the second subsystem,
wherein the first subsystem includes a first physical connector for a first channel to receive the first IP packets and a second physical connector for a second channel to receive the first IP packets, and the second subsystem includes a third physical connector for a third channel to receive the second IP packets and a fourth physical connector for a fourth channel to receive the second IP packets.

3. The system of claim 2, wherein:
the first subsystem includes a first physical interface for the first channel that is coupled to the first physical connector and a first router in the first routing system and a second physical interface for the second channel that is coupled to the second physical connector and the first router in the first routing system, and
the second subsystem includes a third physical interface for the third channel that is coupled to the third physical connector and a second router in the second routing system and a fourth physical interface for the fourth channel that is coupled to the third physical connector and the second router in the second routing system.

4. The system of claim 3, wherein:
when one of the first physical interface and the second physical interface fails, the first IP packets are rerouted through the other of the first physical interface and the second physical interface to the first plurality of transcoder instances, and
when one of the third physical interface and the fourth physical interface fails, the second IP packets are rerouted through the other of the third physical interface and the fourth physical interface to the second plurality of transcoder instances.

5. The system of claim 4, wherein:
the first subsystem includes a fifth physical interface for the first channel and the second channel, wherein the fifth physical interface is coupled to the first router and the first dual physical interface, and
the second subsystem includes a sixth physical interface for the third channel and the fourth channel, wherein the sixth physical interface is coupled to the second router and the second dual physical interface.

6. The system of claim 5, wherein:
the first dual physical interface is coupled to a first switch in the first routing system, wherein the first switch sends the first IP packets to the first plurality of transcoder instances; and
the second dual physical interface is coupled to a second switch in the second routing system, wherein the second switch sends the second IP packets to the second plurality of transcoder instances.

7. The system of claim 6, wherein:
when the first switch fails, the first IP packets for the first channel and the second channel are rerouted through the redundancy connection to the second dual physical interface and second switch to the second plurality of transcoder instances, and
when the second switch fails, the second IP packets for the third channel and the fourth channel are rerouted through the redundancy connection to the first dual physical interface and first switch to the first plurality of transcoder instances.

8. The system of claim 7, wherein the first physical interface, the second physical interface, the third physical interface, the fourth physical interface, the first router, the second router, the fifth physical interface, the sixth physical interface, the first dual physical interface, the second dual physical interface, the first switch, the second switch, the first plurality of transcoder instances, and the second plurality of transcoder instances include isolation circuits to isolate each of them from a system power supply upon a respective failure.

9. A system comprising:
a first subsystem comprising a first plurality of components configured to route video to a first plurality of transcoder instances for transcoding, wherein the first subsystem includes a first host CPU configured to coordinate routing of first IP packets including the video through a first routing system to the first plurality of transcoder instances;
a second subsystem comprising a second plurality of components configured to route the video to a second plurality of transcoder instances for transcoding, wherein the second subsystem includes a second host CPU configured to coordinate routing of second IP packets including the video through a second routing system to the second plurality of transcoder instances; and
a redundancy connection that connects the first subsystem and the second subsystem together to allow routing of the first IP packets or the second IP packets from the one of first subsystem and the second subsystem through the other of the first subsystem and the second subsystem, wherein:
when the first host CPU fails, the second host CPU takes over responsibilities for first host CPU in routing the first IP packets through channels in the first subsystem, and
when the second host CPU fails, the first host CPU takes over responsibilities for second host CPU in routing the second IP packets through channels in the second subsystem.

10. A system comprising:
a first subsystem comprising a first plurality of components configured to route video to a first plurality of transcoder instances for transcoding, wherein the first subsystem includes a first host CPU configured to coordinate routing of first IP packets including the video through a first routing system to the first plurality of transcoder instances;
a second subsystem comprising a second plurality of components configured to route the video to a second plurality of transcoder instances for transcoding, wherein the second subsystem includes a second host CPU configured to coordinate routing of second IP packets including the video through a second routing system to the second plurality of transcoder instances; and
a redundancy connection that connects the first subsystem and the second subsystem together to allow routing of the first IP packets or the second IP packets from the one of first subsystem and the second subsystem through the other of the first subsystem and the second subsystem, wherein the system further includes:
a first system power supply configured to provide system power to the first subsystem and the second subsystem;
a second system power supply configured to provide system power to the first subsystem and the second subsystem; and
logic configured to switch to an available one of the first system power supply and the second system power supply upon failure of one of the first system power supply and the second system power supply.

11. The system of claim 10, wherein the first plurality of components of the first subsystem and the second plurality of components of the second subsystem include isolation circuits to isolate a component that fails from the first system power supply and the second system power supply.

12. A method for transcoding video, the method comprising:
detecting a network topology, wherein the network topology includes:
a first subsystem comprising a first plurality of components configured to route the video to a first plurality of transcoder instances for transcoding, wherein the first subsystem includes a first host CPU configured to coordinate routing of first IP packets including the video through a first routing system to the first plurality of transcoder instances, wherein the first subsystem includes a first dual physical interface;
a second subsystem comprising a second plurality of components configured to route the video to a second plurality of transcoder instances for transcoding, wherein the second subsystem includes a second host CPU configured to coordinate routing of second IP packets including the video through a second routing system to the second plurality of transcoder instances, wherein the second subsystem includes a second dual physical interface;
determining a failure of a component within one of the first subsystem or the second subsystem;
detecting an alternative path through a redundancy connection that connects the first subsystem and the second subsystem together, wherein the first dual physical interface and the second dual physical interface are coupled together to form the redundancy connection; and dynamically changing routing of the first IP packets or the second IP packets from the one of first subsystem and the second subsystem through the other of the first subsystem and the second subsystem via the redundancy connection.

13. The method of claim 12, wherein:

the first subsystem includes a first physical interface for a first channel that is coupled to a first physical connector and a first router in the first routing system and a second physical interface for a second channel that is coupled to a second physical connector and the first router in the first routing system, and the second subsystem includes a third physical interface for a third channel that is coupled to a third physical connector and a second router in the second routing system and a fourth physical interface for a fourth channel that is coupled to a fourth physical connector and the second router in the second routing system, wherein dynamically changing the routing of the video comprises:

when one of the first physical interface and the second physical interface fails, re-routing the first IP packets through the other of the first physical interface, and the second physical interface to the first plurality of transcoder instances, and when one of the third physical interface and the fourth physical interface fails, re-routing the second IP packets through the other of the third physical interface and the fourth physical interface to the second plurality of transcoder instances.

14. The method of claim 13, wherein:

the first subsystem includes a fifth physical interface for the first channel and the second channel, wherein the fifth physical interface is coupled to the first router and the first dual physical interface, and the second subsystem includes a sixth physical interface for the third channel and the fourth channel, wherein the sixth physical interface is coupled to the second router and the second dual physical interface.

15. The method of claim 14, wherein:

the first dual physical interface is coupled to a first switch in the first routing system, wherein the first switch sends the first IP packets to the first plurality of transcoder instances; and the second dual physical interface is coupled to a second switch in the second routing system, wherein the second switch sends the second IP packets to the second plurality of transcoder instances, wherein dynamically changing the routing of the video comprises:

when the first switch fails, re-routing the first IP packets for the first channel and the second channel through the redundancy connection to the second dual physical interface and second switch to the second plurality of transcoder instances, and when the second switch fails, re-routing the second IP packets for the third channel and the fourth channel through the redundancy connection to the first dual physical interface and first switch to the first plurality of transcoder instances.

16. The method of claim 15, wherein the first physical interface, the second physical interface, the third physical interface, the fourth physical interface, the first router, the second router, the fifth physical interface, the sixth physical interface, the first dual physical interface, the second dual physical interface, the first switch, the second switch, the first plurality of transcoder instances, and the second plurality of transcoder instances include isolation circuits to isolate each of them from a system power supply upon a respective failure.

17. A method for transcoding video, the method comprising:

detecting a network topology, wherein the network topology includes:

a first subsystem comprising a first plurality of components configured to route the video to a first plurality of transcoder instances for transcoding, wherein the first subsystem includes a first host CPU configured to coordinate routing of first IP packets including the video through a first routing system to the first plurality of transcoder instances;

a second subsystem comprising a second plurality of components configured to route the video to a second plurality of transcoder instances for transcoding, wherein the second subsystem includes a second host CPU configured to coordinate routing of second IP packets including the video through a second routing system to the second plurality of transcoder instances;

determining a failure of a component within one of the first subsystem or the second subsystem;

detecting an alternative path through a redundancy connection that connects the first subsystem and the second subsystem together; and dynamically changing routing of the first IP packets or the second IP packets from the one of first subsystem and the second subsystem through the other of the first subsystem and the second subsystem via the redundancy connection, wherein dynamically changing the routing of the video comprises:

when the first host CPU fails, the second host CPU takes over responsibilities for first host CPU in routing the first IP packets through channels in the first subsystem, and when the second host CPU fails, the first host CPU takes over responsibilities for second host CPU in routing the second IP packets through channels in the second subsystem.

18. A method for transcoding video, the method comprising:

detecting a network topology, wherein the network topology includes:

a first subsystem comprising a first plurality of components configured to route the video to a first plurality of transcoder instances for transcoding, wherein the first subsystem includes a first host CPU configured to coordinate routing of first IP packets including the video through a first routing system to the first plurality of transcoder instances;

a second subsystem comprising a second plurality of components configured to route the video to a second plurality of transcoder instances for transcoding, wherein the second subsystem includes a second host CPU configured to coordinate routing of second IP packets including the video through a second routing system to the second plurality of transcoder instances;

determining a failure of a component within one of the first subsystem or the second subsystem;

detecting an alternative path through a redundancy connection that connects the first subsystem and the second subsystem together; and dynamically changing routing of the first IP packets or the second IP packets from the one of first subsystem and the second subsystem through the other of the first subsystem and the second subsystem via the redundancy connection,
wherein the network topology includes:
a first system power supply configured to provide system power to the first subsystem and the second subsystem; and
a second system power supply configured to provide system power to the first subsystem and the second subsystem, and wherein dynamically changing the routing of the video includes:
switching to an available one of the first system power supply and the second system power supply upon failure of one of the first system power supply and the second system power supply.

19. The method of claim 18, wherein the first plurality of components of the first subsystem and the second plurality of components of the second subsystem include isolation circuits to isolate a component that fails from the first system power supply and the second system power supply.

20. An apparatus configured to process video in a system including a host computer processing unit (CPU) and a plurality of transcoder instances comprising:
one or more computer processors; and
a non-transitory computer-readable storage medium containing instructions that, when executed, control the one or more computer processors to be configured for:
detecting a network topology, wherein the network topology includes:
a first subsystem comprising a first plurality of components configured to route the video to a first plurality of transcoder instances for transcoding, wherein the first subsystem includes a first host CPU configured to coordinate routing of first IP packets including the video through a first routing system to the first plurality of transcoder instances, wherein the first subsystem includes a first dual physical interface;
a second subsystem comprising a second plurality of components configured to route the video to a second plurality of transcoder instances for transcoding, wherein the second subsystem includes a second host CPU configured to coordinate routing of second IP packets including the video through a second routing system to the second plurality of transcoder instances, wherein the second subsystem includes a second dual physical interface;
determining a failure of a component within one of the first subsystem or the second subsystem;
detecting an alternative path through a redundancy connection that connects the first subsystem and the second subsystem together, wherein the first dual physical interface and the second dual physical interface are coupled together to form the redundancy connection; and
dynamically changing routing of the first IP packets or the second IP packets from the one of first subsystem and the second subsystem through the other of the first subsystem and the second subsystem via the redundancy connection.

* * * * *